United States Patent [19]

Richards

[11] Patent Number: 4,795,904

[45] Date of Patent: Jan. 3, 1989

[54] ELECTRICAL DETECTOR ARRANGEMENTS

[75] Inventor: Lawrence J. Richards, Hampshire, England

[73] Assignee: Plessey Overseas Limited, Ilford, England

[21] Appl. No.: 81,047

[22] Filed: Aug. 3, 1987

[30] Foreign Application Priority Data

Aug. 6, 1986 [GB] United Kingdom ............... 8619190

[51] Int. Cl.$^4$ ............................................. H01L 25/00
[52] U.S. Cl. .............................. 250/332; 250/214 DC
[58] Field of Search ............... 250/330, 332, 333, 334, 250/208, 209, 214 DC; 358/113, 160, 163

[56] References Cited

U.S. PATENT DOCUMENTS 4,686,566  8/1987  Bucher ............................. 250/333 X
4,694,334  9/1987  Bucher et al. .................. 250/333 X
4,724,482  2/1988  Duvent ............................. 358/113

Primary Examiner—Eugene R. LaRoche
Assistant Examiner—David Mis
Attorney, Agent, or Firm—Michael F. Oglo; Julian C. Renfro

[57] ABSTRACT

An electrical detector arrangement is provided having a chopper device for alternately exposing to and obscuring from a detector array a thermal radiation pattern to be detected and imaged. The outputs from the detectors of the array are multiplexed by a multiplexer and then digitized by means of a low cost analogue-to-digital converter. The digital output from the coverter during obscuration of the detector array from the thermal radiation pattern is stored in memory means and this stored data is converted to an analogue signal by a digital-to-analogue converter subtracted from the output of the multiplexer during exposure to and obscuration from the thermal pattern of the detector array by means of a differential amplifier. The output from the differential amplifier which substantially reduces the offset level of the multiplexed detector outputs is then fed to a further low cost analogue-to-digital converter.

4 Claims, 1 Drawing Sheet

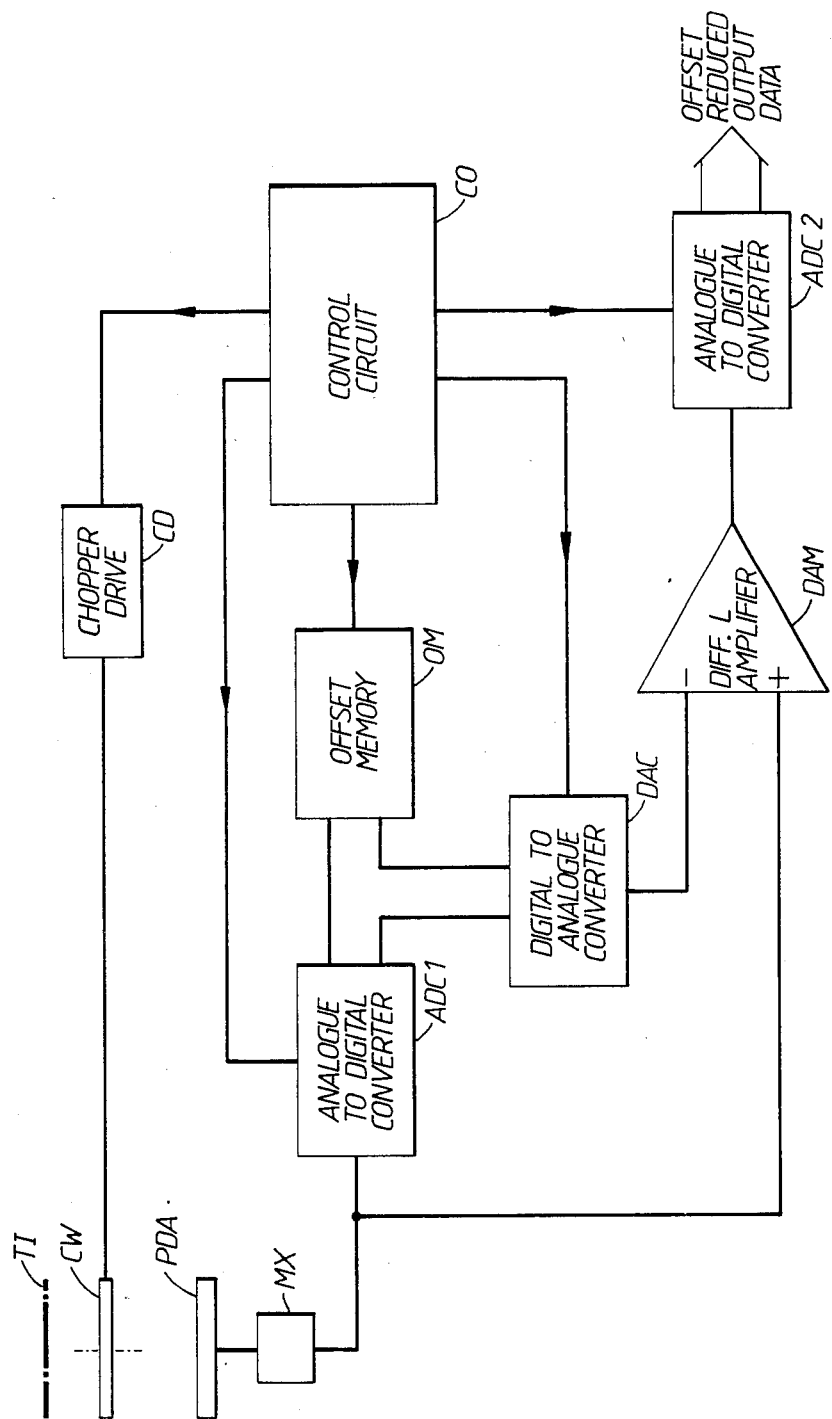

ELECTRICAL DETECTOR ARRANGEMENTS

This invention relates to electrical detector arrangements embodying electrical detector arrays (e.g. pyroelectric detectors) for producing very small electrical output signals superimposed on relatively large d.c. offset levels due to detected ambient energy, in response to the detection of thermal radiation patterns or other forms of energy patterns and relates more specifically to such electrical detector arrangements of the kind in which the multiplicity of outputs from the detectors of the detector array are multiplexed and then processed to effect substantial reduction or removal of the relatively large d.c. offset levels and to achieve so-called image difference processing.

In known electrical detection arrangements of the kind set forth a high resolution converter is used in order to resolve the multiplexed output signals from the detectors of the detector array in the presence of the large d.c. offset levels. Moreover, the use of large detector arrays operating at high frame rates causes the data rate of the multiplexed analogue data train to become high which necessitates a fast conversion.

For the purpose of modulating the thermal radiation incident on the detector array a chopper wheel is rotated in front of the array so that the detector elements are alternately exposed to and obscured from a thermal radiation pattern, for example. Since the detector offset levels due to the ambient heat are substantially constant irrespective of the position of the chopper wheel, the required signal representing the thermal pattern to which the detector array is exposed can be obtained by determining the difference between the detector array outputs when the array is exposed to and obscured from the thermal pattern by the chopper wheel. This process is known as image difference processing.

Hitherto, the multiplexed outputs from the detector array are digitised by a fast high resolution analogue-to-digital converter followed by a digital subtraction stage for image difference processing. This method has the following three disadvantages:

(a) subtraction has to be performed on large digital words;

(b) a powerful, fast, high resolution analogue-to-digital converter is required;

(c) the gain of multiplexed signal cannot be adjusted to vary the dynamic range of the system due to the fact that amplification of the signal prior to digitisation is fixed by the large offset level of the analogue-to-digital converter input range.

According to the present invention there is provided an electrical detector arrangement of the kind hereinbefore set forth having a chopper or equivalent device for alternately exposing to and obscuring from the detector array a thermal radiation or other energy pattern to be detected and imaged, in which the multiplexed outputs from the detectors of the array are digitised by means of a low cost analogue-to-digital converter, in which the digital output from the converter during obscuration of the detector array from the thermal radiation pattern is stored in memory means, in which the stored digital data is subtracted from the digital outputs from the converter during exposure to and obscuration from the thermal radiation or other energy pattern of the detector array by means of a digital-to-analogue converter and a differential amplifier and in which the output from the differential amplifier which substantially reduces the offset level of the multiplexed detector outputs is then fed to a further low cost analogue-to-digital converter.

In carrying out the present invention the chopper, the memory means and the convertors may all be under the control of a common control arrangement.

By way of example the present invention will now be described with reference to the accompanying single-figure drawing showing a block schematic diagram of a pyroelectric thermal imaging arragement.

Referring to the drawing a large pyroelectric detector array PDA comprising a multiplicity of detector elements is arranged to be alternately exposed to and obscured from a thermal radiation pattern TI as a rotatable chopper wheel CW is rotated under the control of a chopper drive means CD which is itself controlled from a system control circuit CO. Due to the heat radiation pattern falling on the pyroelectric detector array PDA in the "open" condition of the wheel DW the detector elements or the array will provide a multiplicity of relatively small electrical outputs corresponding to the thermal pattern being detected, these electrical outputs being superimposed upon respective large d.c. offset level outputs which result from bias levels in the multiplexer, ambient heat radiation incident upon the detector array or other effects. This offset level output will also be present when the chopper wheel CW is in the "closed" position so that it obscures the thermal pattern TI from the detector array PDA. The multiplicity of outputs from the detector elements of the array PDA are multiplexed by multiplexer MX before being fed into a low-cost so-called flash analogue-to-digital converter ADC1 which digitises the multiplexed detector array outputs. The digital output from the converter ADC1 is stored in an offset level memory OM and under the control of the control system circuit CO the memory is updated during each period of the chopper wheel rotation when the wheel CW obscures the thermal pattern TI from the detector array PDA. In this way the digital daaa in the memory store OM corresponds to the ambient heat or offset level output of the detector array PDA. The stored data is then converted back to analogue form by a digital-to-analogue converter DAC and is subtracted from the detector outputs during subsequent "open" and "closed" chopper wheel periods using the converter DAC to which the digitised detector outputs are applied from the converter ADC1 and a differential amplifier DAM which receives the analogue detector outputs.

The output from the differential amplifier DAM which corresponds to the thermal pattern and thus provides a thermal image signal is then digitised by means of a further low cost flash analogue-to-digital converter ADC2 to provide short word-length data in which the offset level has been substantially reduced.

Since the offset level is substantially reduced at the differential amplifier input varying the gain of the differential amplifier DAM allows the dynamic range of the overall system to be adjusted.

I claim:

1. An electrical detector arrangement comprising an electrical detector array for producing a multiplicity of small electrical output signals in response to the detection of an ambient energy pattern in which energy pattern interruptor means are provided for alternately exposing to and obscuring from the detector array an energy pattern to be detected and imaged, in which the electrical outputs from the electrical detector array are applied to a multiplexer the outputs from which include relatively large d.c. offset levels and are digitised by means of an analogue-to-digital converter, in which the digital output from the converter during obscuration of the detector array from the energy pattern is stored in memory means, in which the stored digital data is converted to an analogue signal by a digital-to-analogue converter and subtracted from the analogue outputs of the multiplexer during exposure to and obscuration from the energy pattern of the detector array by means of a differential amplifier and in which the output from the differential amplifier which substantially reduces the offset levels of the multiplexer outputs is then fed to a further analogue-to-digital converter which provides short word-length data corresponding to the detected energy pattern.

2. An electrical detector arrangement as claimed in claim 1, in which the energy pattern interruptor means comprises a rotatable chopper wheel interposed between the detector array and the energy pattern.

3. An electrical detector arrangement as claimed in claim 1 or claim 2 in which the interruptor means, memory means and the converters are under the control of a common control arrangement.

4. An electrical detector arrangement as claimed in claim 1, in which the detector array comprises pyroelectric detectors for responding to a thermal radiation energy pattern.

* * * * *